Nov. 15, 1966   W. J. SACKETT, SR   3,285,704
AMMONIATED FERTILIZER MANUFACTURING APPARATUS AND SYSTEM
Filed Aug. 14, 1964                              2 Sheets-Sheet 1

INVENTOR
WALTER J. SACKETT, SR.

BY Walter J. Finch
ATTORNEY

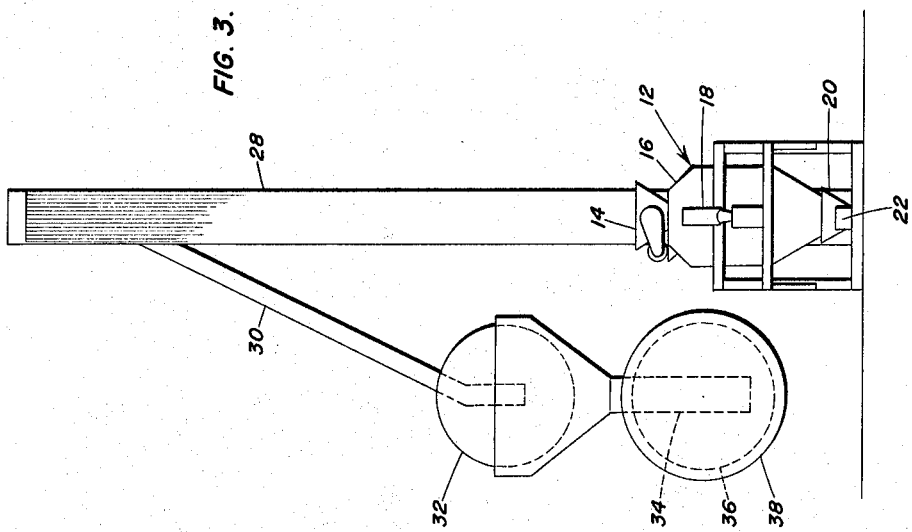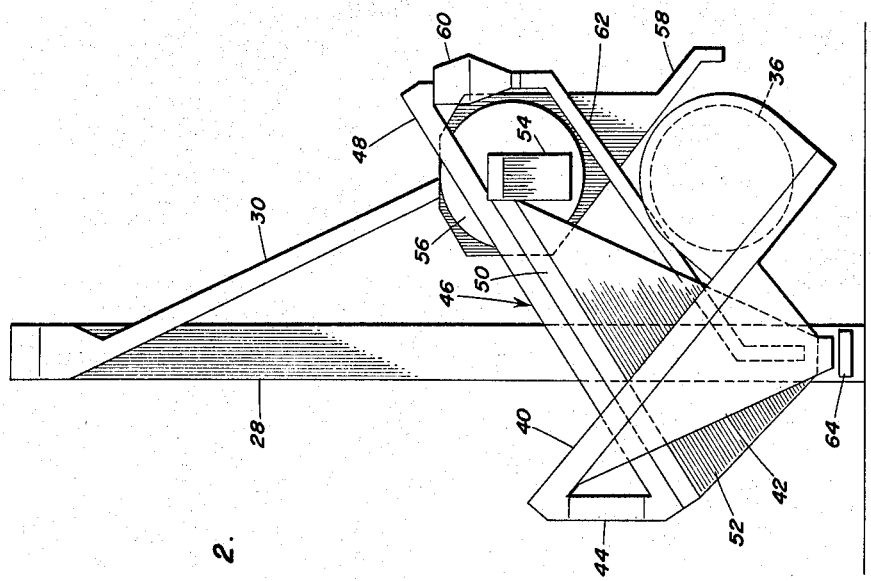

3,285,704
AMMONIATED FERTILIZER MANUFACTURING
APPARATUS AND SYSTEM
Walter J. Sackett, Sr., 3700 Echodale Ave.,
Baltimore, Md.
Filed Aug. 14, 1964, Ser. No. 389,606
15 Claims. (Cl. 23—259.1)

This invention relates generally to granulating plants, and more particularly it pertains to ammoniated fertilizer manufacturing apparatus and system.

It is an object of this invention to provide a continuous manufacturing plant for producing ammoniated fertilizers and delivering a granulated product of uniform size with the least possible handling of the materials.

Another object of this invention is to provide a fertilizer manufacturing apparatus which is compact and highly efficient in delivering an acceptable size product.

To provide a fertilizer manufacturing plant wherein the movement of product constituents therethrough is mainly by gravity, all elevations save one, being free ancillary benefits, is another object of this invention.

Other objects and attendant advantages of this invention will become more readily apparent and understood from the following detailed specification and accompanying drawings in which:

FIG. 2 is a left end view of the plant of FIG. 1; and

FIG. 3 is a right end view of the plant of FIG. 1.

Figure 1:
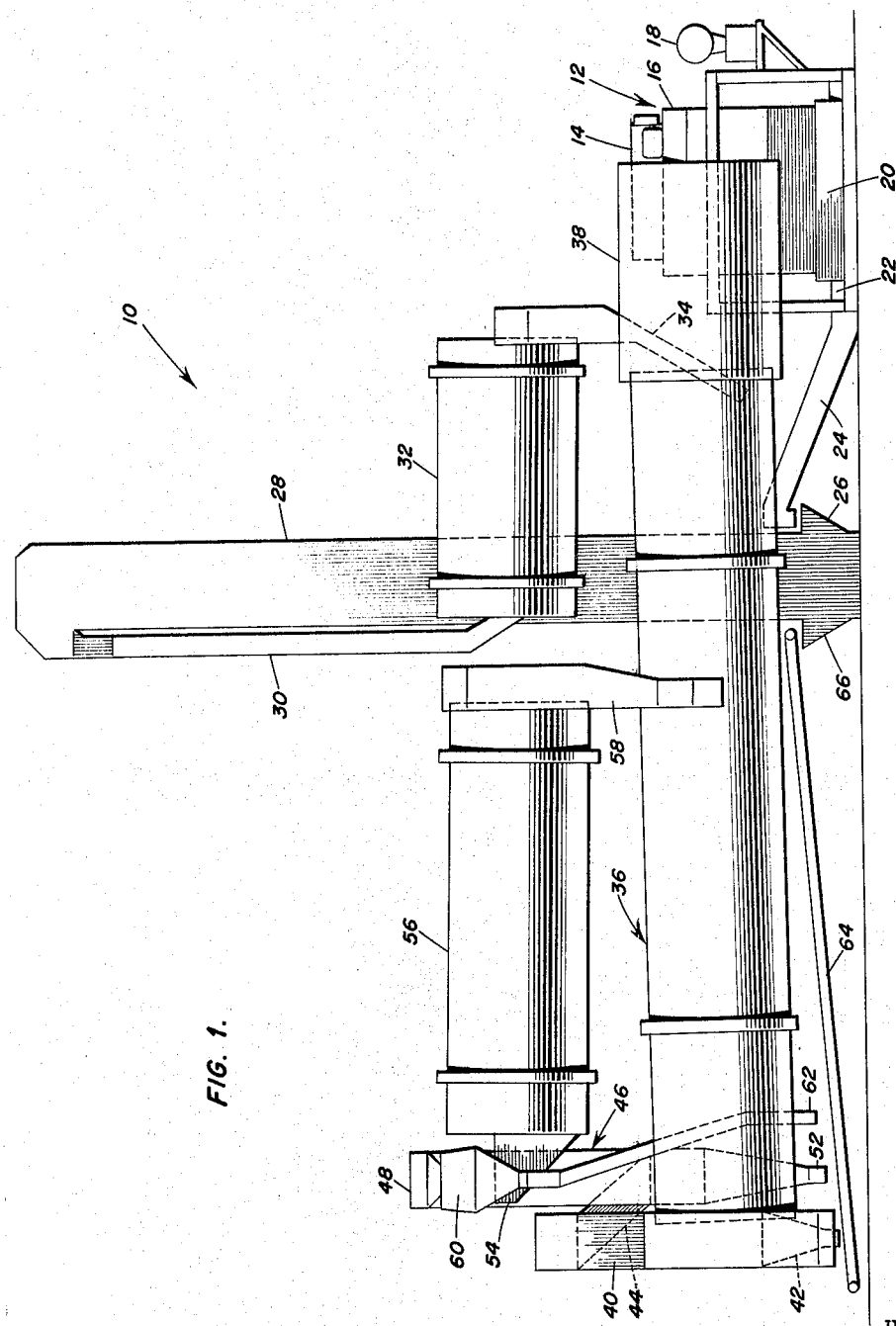
FIG. 1 is a side elevation of an ammoniated fertilizer manufacturing plant incorporating features of this invention.

Referring now to the details of the drawings and particularly FIGS. 1 and 3, reference numeral 10 designates generally an entire plant or system for manufacturing chemical plant foods, such as fertilizer, having an important compounding and blending apparatus 12. This apparatus 12 consists of a receiving funnel 14 which receives and breaks up charges of chemical ingredients of fertilizer as they are introduced by power shovel.

This receiving funnel 14 is mounted upon a weight hopper 16 which is suspended in balance with a dial scale 18. The hopper 16 is internally compartmented so as to divide and commingle the ingredients as they are weigh measured. When the last ingredient of a batch is received in this hopper 16, it is dumped by trapdoor means (not shown) into a receiving funnel 20. This funnel 20 cooperates with a horizontal conveyer section 22 to divide and recombine the received weighed batch and agitate and transport it by endless chain mounted paddles up an elevating section 24. Through adjustable feed means (not shown) in funnel 20, the flow rate is also controlled.

The now thoroughly mixed ingredient batch discharges into a charging hopper 26 of a vertical bucket-type elevator 28 where it is lifted by motor power to the top of a chute 30.

The lower end of chute 30 feeds the elevated material in continuous flow down into a rotary drum ammoniator-granulator 32 where ammonia derivatives and acids together with water and steam are combined and the mixture subjected to the tumbling action. This ammoniator-granulator 32 is inclined so that the treated material discharges by gravity at its lower end as damp pellets into a chute 34 which then are introduced to a dryer 36.

This rotary drum type dryer 36 and a combustion chamber 38, end to end, are mounted directly beneath the ammoniator-granulator 32 and generally parallel thereto. They slope, however, in the opposite direction.

The pellets of material received from chute 34 further compact and dry in traversing the dryer 36 under the influence of hot gas from the combustion chamber 38 and discharge upon a single deck screen 40 as best shown in FIG. 2.

This single deck screen 40 is of an upwardly traveling conveyer belt type which pushes the pellets up an inclined screen deck. Dust and broken or undersized pellets fall through the screening and are gathered by a fines funnel 42 located beneath.

The thus elevated larger masses and pellets fall from the upper end of the screen 40 down a chute 44 to a similar type deck screen 46. This screen assembly 46 differs from screen 40, however, in also having a lower second stage screen or acceptable size section 50, both operating together. Thus all oversize material travels the full length up the oversize section 48 to tumble into a mill 60 while acceptable size and fines drop upon section 50.

The acceptable size section 50 eliminates any remaining fines which fall through and are gathered by a fines funnel 52. The pellets of acceptable size range continue to the top of section 50 and drop into the inlet 54 of a cooler 56. This cooler 56 is of the rotary drum type and is mounted in general alignment with the axis of the previously mentioned ammoniator 32. An exhaust fan and stack (not shown), is connected to the cooler 56 removes the heat given off by the pellets.

A product delivery chute 58 at the lower end of the cooler 56 receives the pellet product and from this elevated position delivery can be made directly to storage, spreader trucks or to bags.

The fines collected by the funnels 42, 52 and from a chute 62 leading from the oversize grinding mill 60 are discharged on a generally horizontally moving conveyer 64 and reintroduced through a fines return hopper 66 to the elevator 28 for reprocessing.

Obviously many modifications and variations of the present invention are possible in light of the above teachings. It is, therefore, to be understood that within the scope of the appended claims the invention may be practiced otherwise than as specifically described.

What is claimed is:

1. A continuous manufacturing plant for the manufacture of plant food material, comprising inclined ammoniator-granulator means for receiving plant food material and ammoniating and granulating it, dryer means inclined in the opposite direction from said ammoniator-granulator means for receiving the discharge therefrom and drying it, first upwardly moving inclined screen means for receiving the dried material from said dryer means, second upwardly moving screen means inclined in the opposite direction from said first screen means for receiving the oversize dried material therefrom, and cooler means inclined in the opposite direction from said dryer means for cooling the acceptable product from said second screen means.

2. A continuous manufacturing plant as recited in claim 1, wherein said dryer means is positioned beneath said ammoniator-granulator means and said cooler means.

3. A continuous manufacturing plant as recited in claim 1, wherein said first and second screen means are positioned transverse to the axis of said dryer means.

4. A continuous manufacturing plant as recited in claim 1, and additionally, mill means for milling the oversize product from said second screen means.

5. A continuous manufacturing plant as recited in claim 4, and additionally means collecting the product from said mill means and the undersize product from said first and second screen means and returning the collected material to said ammoniator-granulator means.

6. A continuous manufacturing plant as recited in claim 1, and additionally means supplying a weighed and mixed batch of said plant food material to said ammoniator-granulator means.

7. A continuous manufacturing plant as recited in claim 6, wherein said supplying means includes a compartmented weighing hopper for weighing, dividing, and gravity mixing said fertilizer material.

8. A continuous manufacturing plant as recited in claim 7, wherein said supplying means includes a vertical conveyor structure for delivering the product from said weighing hopper to said ammoniator-granulator means.

9. A continuous manufacturing plant as recited in claim 8, wherein said supplying means are in one line and said ammoniator-granulator means, dryer means, and cooler means are in another line, with said first and second screen means extending transversely from said another line to a location beyond said one line.

10. A continuous manufacturing plant as recited in claim 9, and additionally means positioned in said one line for recycling undersize material to said supplying means.

11. A continuous manufacturing plant for the manufacture of fertilizer material, comprising, inclined ammoniator-granulator means for receiving said fertilizer material and ammoniating and granulating it, dryer means extending in line with and beneath said ammoniator-granulator means but inclined in the opposite direction therefrom for receiving its discharged material and drying said discharged material, first upwardly moving inclined screen means extending transverse to the axis of said dryer means for receiving the dried material therefrom, second upwardly moving screen means extending transverse to the axis of said dryer means and inclined in the opposite direction from said first screen means for receiving the oversize dried material therefrom, and cooler means axially superimposed over a portion of said dryer means but inclined to the opposite direction therefrom for cooling the acceptable product from said second screen means.

12. A continuous manufacturing plant for the manufacture of fertilizer material, comprising, a first line of equipment including inclined ammoniator-granulator means for receiving said fertilizer material and ammoniating and granulating it, dryer means extending beneath said ammoniator-granulator means but inclined in the opposite direction therefrom for receiving its discharged material and drying said discharged material, and cooler means superimposed over a portion of said dryer means but inclined in the opposite direction therefrom for cooling acceptable granule sizes of dried material obtained from said dryer means, a second line of equipment adjacent to said first line and including means for weighing and mixing said fertilizer material and means for elevating the weighed and mixed fertilizer material, means directing the discharge from said last mentioned means to said ammoniator-granulator means, and upwardly moving screen means extending transversely between said first and second line of equipment for receiving the dried material from said dryer means and supplying said acceptable granule sizes to said cooler means.

13. A continuous manufacturing plant as recited in claim 12, wherein said upwardly moving screen means includes a pair of oppositely inclined screen decks, with the screen deck receiving said dried material from said dryer means discharging its oversize product onto the other screen deck of said pair.

14. A continuous manufacturing plant as recited in claim 12, and additionally means positioned in said second line of equipment for delivering undersize granules from said screen means to said elevating means.

15. A continuous manufacturing plant as recited in claim 14, wherein said upwardly moving screen means includes a pair oppositely inclined screen decks, with the screen deck receiving said dried material from said dryer means discharging its oversize product onto the other screen deck of said pair, and additionally, funnel means collecting the undersize granules from each of said screen decks and supplying said undersize granules to said delivering means.

No references cited.

MORRIS O. WOLK, *Primary Examiner.*

J. H. TAYMAN, JR., *Assistant Examiner.*